April 17, 1951     O. A. HANSEN ET AL     2,549,463
FISH LURE
Filed April 1, 1947
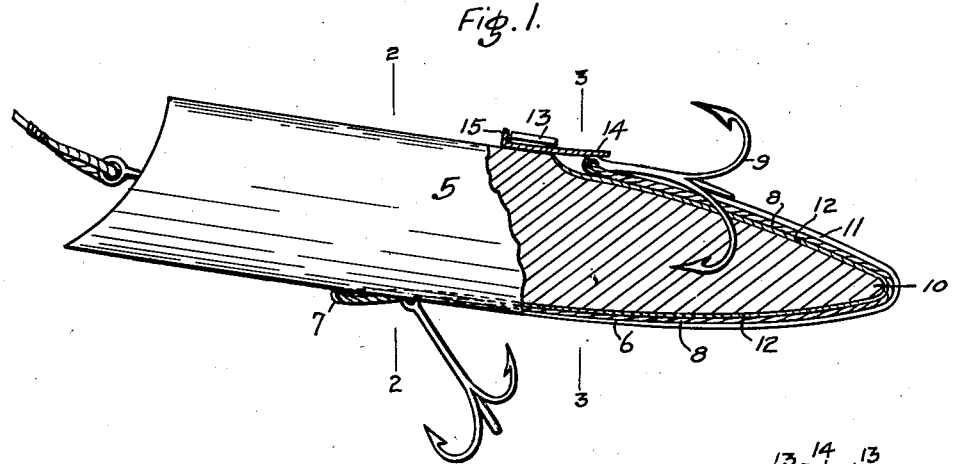
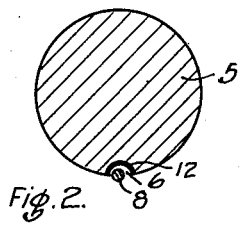
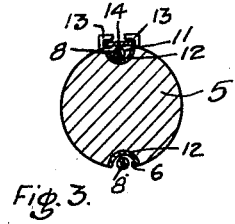
Oswald A. Hansen
Leland E. Cook
           INVENTORS
BY Patented Apr. 17, 1951

2,549,463

UNITED STATES PATENT OFFICE 2,549,463

FISH LURE

Oswald A. Hansen and Leland E. Cook,
Gig Harbor, Wash.

Application April 1, 1947, Serial No. 738,578

1 Claim. (Cl. 43—42.04)

This invention relates to fish lures, especially to that type commonly known as plugs.

One object of our invention is to provide means for releasably securing the hook close to the body of the plug and in such position that the fish striking the lure from any direction will inevitably be caught by the hook and will pull the hook free from the plug. Further objects are to locate the hook in such manner that it will be substantially concealed by the lure; to conceal the line connecting the lure with the hook and thus maintain the general shape of the lure as being similar to that of a small fish; and to rid the lure of any depending attachments.

We attain these and other objects as will be obvious to those familiar with the art, by the devices and arrangements illustrated in the accompanying drawings, in which—

Fig. 1 is a side elevation, partly in section, of our improved lure; and Figs. 2 and 3 are cross-sections thereof, taken on the lines 2—2 and 3—3, respectively.

Similar numerals of reference refer to similar parts throughout the several views.

Apparently the fish are as likely to strike downward or from the side of the lure as they are to strike upward and are unlikely to be caught by a hook dangling more or less freely a short distance from the lure. For this reason we do not have a hook dangling on the end of a short line under the lure but secure the under hook close to the body of the lure.

Referring now to the drawings, the general shape of the plug 5 is substantially the usual shape and is not important to this invention. However, we form a groove 6 along the belly of the lure from the fastening 7, to which the line 8 of the hook 9 is attached, to the tail end 10, and connecting around the tail with a similar groove 11 along the back to a point midway of the lure. These grooves 6 and 11 are lined with a metal lining 12.

Adjacent the forward end of the groove 11 we secure a pair of cleats 13, separated from and parallel to each other and holding a spring clip 14 between them. The rearward end of the clip 14 lies over the forward end of the groove 11 and is adapted to hold the head of the hook 9 firmly in said groove 11, as shown. This clip 14 may be slid between the cleats 13 to engage the hook, but is provided with a turned up end 15 adapted to prevent its slipping rearward from between said cleats.

When the fish strikes at the lure from above it is caught by the hook 9 and immediately tries to break away. This action snaps the hook out from under the clip 14 so that it drags a few inches to the rear of the lure, and this momentary freedom causes the fish to jerk at the hook with the result that it is caught more firmly thereby.

Of course changes may be made in the details of our invention without departing from the spirit thereof as outlined in the appended claim.

Having described our invention, what we claim and desire to secure by Letters Patent is:

A fish lure adapted to be permanently secured to a fish line and having a continuous groove in its back, belly and around the tail, a hook, means on the back of the lure for releasably securing the hook to said back adjacent said groove; and a supplemental line secured to said hook and lying in said continuous groove and means securing the supplemental line to the belly of said lure.

OSWALD A. HANSEN.
LELAND E. COOK.

REFERENCES CITED

The following references are of record in the file of this patent:

UNITED STATES PATENTS

| Number | Name | Date |
|---|---|---|
| 414,857 | Cash | Nov. 12, 1889 |
| 428,820 | Stafford | May 27, 1890 |
| 573,572 | Dales | Dec. 22, 1896 |
| 1,200,135 | Reynolds | Oct. 3, 1916 |
| 2,102,492 | Stolley | Dec. 14, 1937 |
| 2,147,444 | Kelly | Feb. 14, 1939 |
| 2,165,071 | Saarela | July 4, 1939 |
| 2,171,372 | Peck | Aug. 29, 1939 |
| 2,181,254 | Wilson | Nov. 28, 1939 |
| 2,246,757 | Rosegard | June 24, 1941 |